US008428238B2

(12) United States Patent
Jain et al.

(10) Patent No.: US 8,428,238 B2
(45) Date of Patent: Apr. 23, 2013

(54) SYSTEM AND METHOD FOR ENSURING CALL PRIVACY IN A SHARED TELEPHONE ENVIRONMENT

(75) Inventors: Mukul Jain, San Jose, CA (US); Martin R. Eppel, Santa Clara, CA (US); Aaron Tong, San Jose, CA (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1734 days.

(21) Appl. No.: 11/196,368

(22) Filed: Aug. 3, 2005

(65) Prior Publication Data

US 2007/0036298 A1  Feb. 15, 2007

(51) Int. Cl.
*H04M 3/42* (2006.01)
*H04M 1/64* (2006.01)
*H04M 13/00* (2006.01)

(52) U.S. Cl.
USPC ............... 379/207.13; 379/88.19; 379/177

(58) Field of Classification Search ............ 379/234, 379/88.02, 88.17, 88.22
See application file for complete search history.

(56) References Cited

U.S. PATENT DOCUMENTS

| 4,805,210 | A | 2/1989 | Griffith, Jr. |
| 5,432,844 | A | 7/1995 | Core et al. |
| 5,608,786 | A | 3/1997 | Gordon |
| 5,615,213 | A | 3/1997 | Griefer |
| 5,794,218 | A | 8/1998 | Jennings et al. |
| 5,937,040 | A | 8/1999 | Wrede et al. |
| 5,943,402 | A * | 8/1999 | Hamel et al. ............... 379/88.26 |
| 5,999,599 | A | 12/1999 | Shaffer et al. |
| 6,044,081 | A | 3/2000 | Bell et al. |
| 6,157,953 | A * | 12/2000 | Chang et al. ............... 709/225 |
| 6,259,405 | B1 | 7/2001 | Stewart et al. |
| 6,271,764 | B1 | 8/2001 | Okamura |
| 6,421,544 | B1 | 7/2002 | Sawada |
| 6,438,600 | B1 | 8/2002 | Greenfield et al. |
| 6,526,293 | B1 | 2/2003 | Matsuo |
| 6,545,596 | B1 | 4/2003 | Moon |
| 6,564,261 | B1 | 5/2003 | Gudjonsson et al. |
| 6,587,680 | B1 | 7/2003 | Ala-Laurila |
| 6,643,774 | B1 | 11/2003 | McGarvey |
| 6,757,544 | B2 * | 6/2004 | Rangarajan et al. ....... 455/456.1 |
| 6,769,000 | B1 | 7/2004 | Akhtar et al. |
| 6,792,296 | B1 | 9/2004 | Van Bosch |
| 6,792,297 | B2 | 9/2004 | Cannon et al. |
| 6,799,052 | B2 | 9/2004 | Agness et al. |

(Continued)

OTHER PUBLICATIONS

How to Build Smart Appliances, Albercht Schmidt, Kristof Van Laerhoven, IEEE Personal Communications, Aug. 2001, pp. 66-71.

*Primary Examiner* — Joseph T Phan
(74) *Attorney, Agent, or Firm* — Baker Botts L.L.P.

(57) ABSTRACT

A system and method for an enterprise includes a telephone device operable to receive an incoming call directed from a caller to a called party, the telephone device being shared among a plurality of persons within the enterprise. A software or hardware (firmware) module with code that runs on a PBX system of the enterprise authenticates a person answering the incoming call as the called party before connecting the incoming call to the telephone device. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

17 Claims, 3 Drawing Sheets

U.S. PATENT DOCUMENTS

| | | |
|---|---|---|
| 6,804,334 B1 | 10/2004 | Beasley et al. |
| 6,816,469 B1 | 11/2004 | Kung et al. |
| 6,839,761 B2 | 1/2005 | Kadyk et al. |
| 6,847,715 B1 | 1/2005 | Swartz |
| 6,870,835 B1 | 3/2005 | Chen et al. |
| 6,876,734 B1 | 4/2005 | Summers et al. |
| 6,905,414 B2 | 6/2005 | Danieli et al. |
| 6,907,123 B1 | 6/2005 | Schier |
| 6,931,001 B2 | 8/2005 | Deng |
| 6,934,858 B2 | 8/2005 | Woodhill |
| 6,947,417 B2 | 9/2005 | Laursen et al. |
| 6,985,745 B2 | 1/2006 | Quaid |
| 6,987,744 B2 | 1/2006 | Harrington et al. |
| 7,191,239 B2 * | 3/2007 | Rozenfeld et al. ............ 709/229 |
| 7,460,020 B2 * | 12/2008 | Reyes et al. ................ 340/573.1 |
| 7,881,446 B1 * | 2/2011 | Apple et al. ............ 379/114.21 |
| 8,139,564 B1 * | 3/2012 | Weaver et al. ................ 370/352 |
| 8,166,184 B2 * | 4/2012 | Ananthanarayanan et al. ............................ 709/229 |
| 8,265,587 B2 * | 9/2012 | D'Evelyn et al. .......... 455/404.1 |
| 2002/0010008 A1 | 1/2002 | Bork et al. |
| 2002/0068537 A1 | 6/2002 | Shim et al. |
| 2002/0086680 A1 | 7/2002 | Hunsinger |
| 2002/0177428 A1 * | 11/2002 | Menard et al. ................ 455/404 |
| 2002/0178228 A1 | 11/2002 | Goldberg |
| 2002/0181691 A1 * | 12/2002 | Miller et al. .................. 379/234 |
| 2002/0198004 A1 | 12/2002 | Heie et al. |
| 2003/0061496 A1 | 3/2003 | Ananda |
| 2004/0131206 A1 | 7/2004 | Cao et al. |
| 2004/0248586 A1 | 12/2004 | Patel et al. |
| 2005/0157708 A1 | 7/2005 | Chun |
| 2005/0177622 A1 | 8/2005 | Spielman et al. |
| 2005/0272413 A1 | 12/2005 | Bourne |
| 2006/0034336 A1 | 2/2006 | Huh et al. |
| 2006/0116175 A1 | 6/2006 | Chu |

\* cited by examiner

SYSTEM AND METHOD FOR ENSURING CALL PRIVACY IN A SHARED TELEPHONE ENVIRONMENT

FIELD OF THE INVENTION

The present invention relates generally to the field of telecommunications; more specifically, to business telephone systems and to methods and apparatus for ensuring call privacy.

BACKGROUND OF THE INVENTION

A telephone number is a sequence of digital digits (0-9) that is used for identifying a destination telephone in a telephone network. Most telephones are interconnected via a conventional public switched telephone network (PSTN), where the format of telephone numbers is standardized by the International Telecommunication Union (ITU). In the past, businesses had a single telephone number for a main switchboard, with a switchboard operator connecting callers to various individuals within that business. In cases where the called party did not answer, the caller was typically transferred back to the main switchboard.

Today, with the widespread use of voicemail and other advanced communication technologies, many enterprises use Direct Inbound Dialing (DID) lines so that an outside caller may call directly to a person within a business. Often times, the DID number uses a pattern from the called party's telephone internal extension, e.g., where the last three or four digits symbolize the called person's ("callee's") extension.

A private telephone network known as a private branch exchange (PBX) is commonly used within many enterprises. In a PBX, users in a business organization share a certain number of outside lines. A general description of PBX systems and a combined computer telephone integration (CTI) and PBX system that enables custom telephone features for multi-function telephone sets (MTS) located in a hotel room is disclosed in U.S. Pat. No. 6,798,874. An IP conference telephone system compatible with IP-PBX systems is disclosed in U.S. Pat. No. 6,654,455.

In certain PBX systems, a small number of telephones may be shared among a large number of employees to reduce equipment costs and expenses. For example, large retail stores with dozens of sales representatives, industrial laboratories, and large manufacturing centers with hundreds of factory floor workers, may arrange their workplace so as to have a limited number of phone devices distributed about the building for general use among the employees. Each employee is typically assigned a unique extension number. Callers to a main business number may be prompted by an interactive voice response (IVR) system to enter the extension of the person with whom they wish to speak. In many cases, incoming calls to all extension numbers are routed through the PBX system to the commonly shared telephone devices.

The problem with these prior art systems, however, is that any worker with access to the shared telephone devices may answer any call to any extension number. Thus, sharing telephone equipment with others—while reducing equipment costs and expenses—does come at the price of potentially comprising the privacy of the caller and/or callee.

A variety of different, specific solutions to the problem of telephone privacy have been proposed. One simple approach, for example, is taught in U.S. Pat. No. 6,917,672, which teaches identifying parties to a call so that a third party authority—which may include a business, a parent, a court, or some other authority—can regulate calls according to caller and callee pairs. U.S. Pat. No. 6,912,275 teaches a telephone answering system that provides security for a voicemail message platform through the use of a one-time password process. Additionally, U.S. Pat. No. 6,918,034 discloses a method and apparatus to provide encryption and authentication of a mini-packet in a multiplexed real-time protocol (RTP) payload transported across an IP telephony network.

Despite past efforts aimed at ensuring call privacy in the business enterprise environment, there still remains an unsatisfied need for a mechanism that allows sharing of telephone devices for receiving incoming calls without compromising call privacy.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

A system and method that provides for callee authentication on a per call basis, thereby allowing for the sharing of telephone equipment among multiple users without compromising call privacy, is described. In the following description specific details are set forth, such as device types, system configurations, authentication methods, etc., in order to provide a thorough understanding of the present invention. However, persons having ordinary skill in the arts will appreciate that these specific details may not be needed to practice the present invention.

According to one embodiment of the present invention, a PBX/telephony system is provided for an enterprise in which the intended recipient of a call (i.e., the called party or callee) is authenticated before they may receive the call at a shared telephone device. The call can originate from either outside or inside the enterprise; that is, the invention is applicable to internal calls (where the caller and called party are both within the enterprise) and also to calls received from devices external to the enterprise. In a specific implementation, the PBX system is an Internet Protocol (IP) software-based business phone system that provides call routing of voice over IP (VoIP) calls. The IP-PBX system may comprise software or hardware (firmware) that includes executable code to implement the functionality and features described below. By way of example, in various embodiments the present invention may be implemented by a software module installed in Cisco System's IP Communicator, Call Manager, Softphone, and IP phone (e.g., 79XX series) products. In other instances, the present invention may be implemented by modifying known operating protocols between the PBX system and the telephone devices, such as the Session Initiation Protocol (SIP) or the Skinny Call Control Protocol (SCCP).

Figure 1:
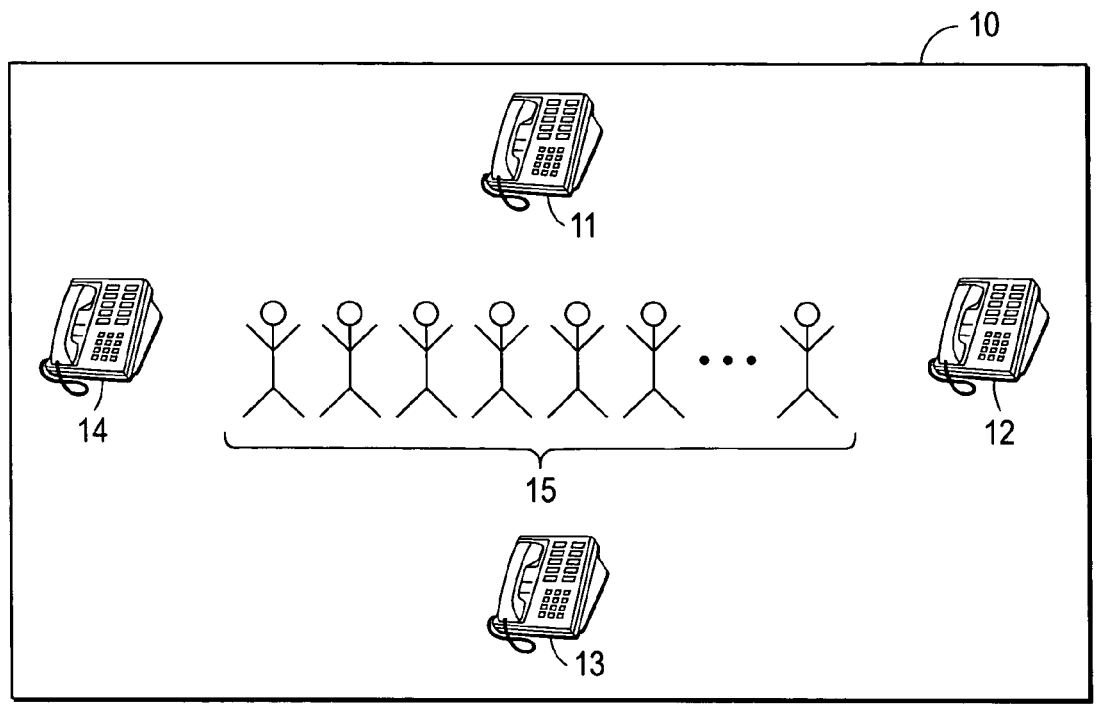
FIG. 1 is a diagram showing an exemplary workplace environment in accordance with one embodiment of the present invention.

Referring to FIG. 1, there is shown an exemplary workplace environment 10 with telephone devices 11-14 distributed for use by a plurality of workers 15. Typically, the number of workers greatly exceeds the number of telephone devices in workplace 10 such that devices 11-14 are shared in common among the workers. Alternatively, telephone devices 11-14 may each be assigned to be shared among different subsets of workers 15. For example, all of the workers on the first floor of the workplace building, or who work in a certain department, may share telephone device 11; all of the workers on the second floor, or who work in another department, may share telephone device 12, and so on. It should be understood, of course, that the present invention is not limited to enterprises having a certain workforce size, telephone devices, or workplace configurations. That is, the present invention is applicable to businesses where the number and ratio of employees to telephones, as well as the workplace environment, varies greatly.

Figure 2:
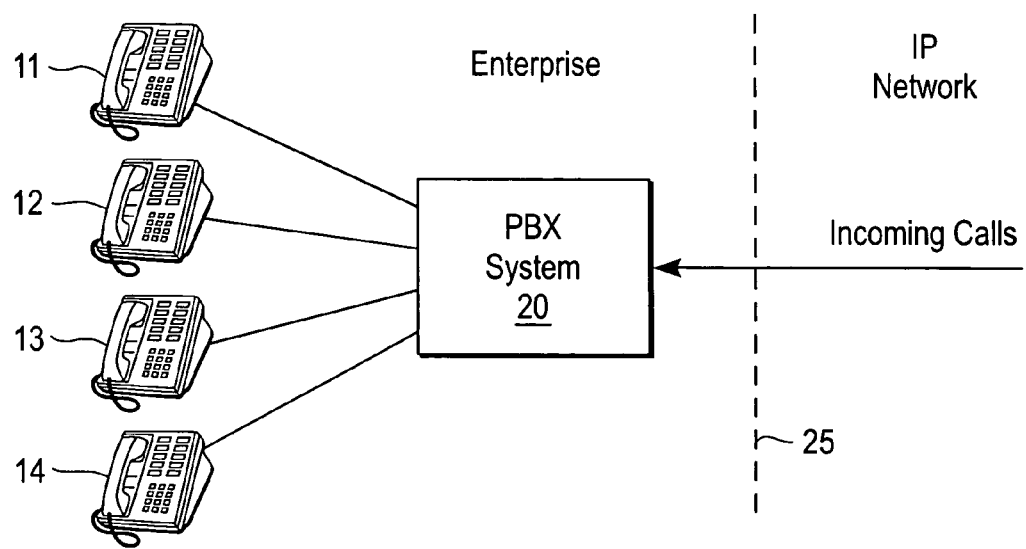
FIG. 2 is a high-level conceptual diagram that illustrates a PBX system of an enterprise connected with a plurality of telephone devices in accordance with one embodiment of the present invention.

FIG. 2 is a conceptual diagram that illustrates an IP-PBX system 20 connected with respective ports of telephone devices 11-14 within an enterprise. IP-PBX system 20 is also coupled to receive an incoming VoIP call transmitted across an IP network in accordance with one embodiment of the present invention. Dashed line 25 represents the dividing line between the enterprise environment and the external or public IP network. Each of telephone devices 11-14 includes a processor and executable code that supports the connection protocol described below.

It is appreciated that system 20 in FIG. 2 may also include a connection to a traditional Integrated Services Digital Network (ISDN) and/or PSTN. Furthermore, in an alternative embodiment, system 20 may comprise a conventional circuit-switched PBX system, rather than an IP-PBX system capable of receiving VoIP calls.

Figure 4:
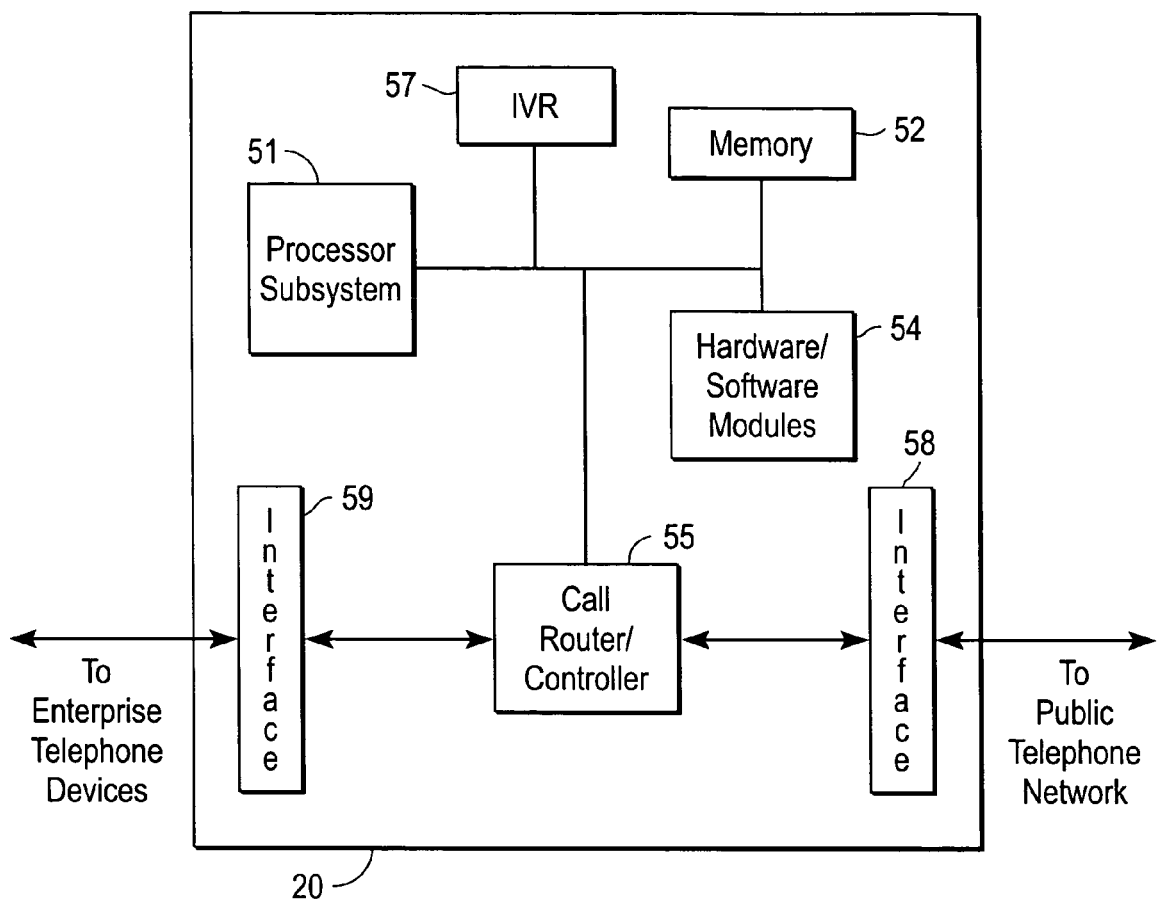
FIG. 4 is a block diagram of a PBX system according to one embodiment of the present invention.

FIG. 4 shows an exemplary PBX system 10 according to one embodiment of the present invention that includes a processor subsystem 51 having one or more processors coupled to a memory 52 (e.g., RAM) that may comprise an authentication database, an IVR unit 57, hardware/software modules 54, and a call router/controller unit 55 that functions to route calls between interfaces 58 & 59 having lines connected to a public telephone network and telephone devices of the enterprise, respectively. Call router/controller unit 55 may also be utilized for communications with callers and the users of the enterprise telephone devices. An example of such communications is the play-out of IVR scripts to the caller and to users during the authentication process.

In one implementation, IVR unit 57 comprises a telephony script or a navigation menu module that may prompt a caller or telephone user to solicit certain information, such as the name or extension number of the callee, as well as play out various notifications. IVR 57 may also be useful in soliciting other information about the caller (e.g., the caller's name). IVR unit 57 is typically embodied in one or more software or firmware modules with code that executes on one or more processors of subsystem 51. In other embodiments, IVR unit 57 may include dedicated processors that perform various tasks, such as speech processing, verification, and recognition.

It is appreciated that PBX system 20 may also include a variety of other devices (e.g., controllers, EEPROMs, specialized processors, etc.) not shown in FIG. 4.

In an exemplary embodiment, when a caller wants to speak with an individual within the business enterprise, he may dial the main telephone number of the business and speak with an operator who will route the call to the appropriate shared telephone device(s). Another option is for the caller to be automatically prompted by an IVR system for the name or extension number of the person with whom they wish to speak, with the call being routed following entry of a valid extension or name by the caller. Alternatively, the caller may dial the person's unique DID number to connect the call directly with the shared device(s).

Regardless of the manner in which the call is placed and routed, a call notification mechanism is employed to notify the called party that an incoming call has arrived for them. The call notification mechanism may simply comprise a ringing telephone device with a display listing the callee's name and/or extension number. In other embodiments, text-to-speech (TTS) technology may be utilized to automatically announce the name of the person being called. Some enterprises may also include an automatic paging device to page or audibly announce the name of the called party. In still other embodiments, the PBX system may also be integrated with an automated business/enterprise directory system.

The authentication process begins when a person attempts to answer the call at one of the shared telephone devices 11-14; that is, when a user tries to answer an incoming call, the PBX system asks the person to authenticate their identity. Authentication may occur in a number of different ways. For example, an IVR prompt may ask the user to enter a keyword or secret personal identification number (PIN), the entry of which is then matched by the system against an identity database. For instance, if the entered PIN matches the stored PIN of the called person, the call is automatically connected. On the other hand, if an incorrect PIN is entered, the user may be granted several opportunities to retry to enter the correct PIN before the call is either terminated or redirected to the called party's personal voicemail box.

The PIN may comprise a unique 4-5 digit number, which might take around 4-5 seconds to enter. During this process, the caller may continue to hear a ringback tone. Another possibility is for the caller to be notified by an IVR script that the callee's identity is being authenticated and to remain on the line until the process is successfully completed.

In another embodiment, the PBX system may authenticate the callee's identity using known speech recognition techniques, or other speaker verification technologies, or some combination of speech recognition and keyword/passcode entry. In a specific implementation, for example, the IVR system may connect the call upon recognition of a secret code word (e.g., "tiger", or "walleye") spoken by the person who picks up the shared telephone device. In other cases, the system may require voice signature matching of the user with a known voice signature of the called person.

In still another embodiment, the enterprise telephone system may be configured to permit proxy users to answer certain calls. For example, employees who are working on a certain project may be authorized to answer each other's calls from the group's supervisor. Another example is a secretary who is authorized to answer a certain category of calls for her boss. Such a proxy, however, would not be extended to situations where the caller's identity was unknown, say, where the caller is a personal friend or relative of an employee. In other words, the system may be configured with lists of users authorized to answer all or a limited number of calls directed to other employees based on a set of rules. It is appreciated that this proxy system does not require sharing of passwords; rather, security is insured by electronic database lookup (e.g., where a processor associated with a server accesses a memory) to match the proxy user with the caller and/or callee identity.

Proxy authorization may be temporal in nature, lasting only for a predetermined length of time (e.g., for the duration of an employee's known vacation period). Additionally, different hierarchical security levels may be implemented in a proxy system according to one embodiment of the present invention.

Figure 3:
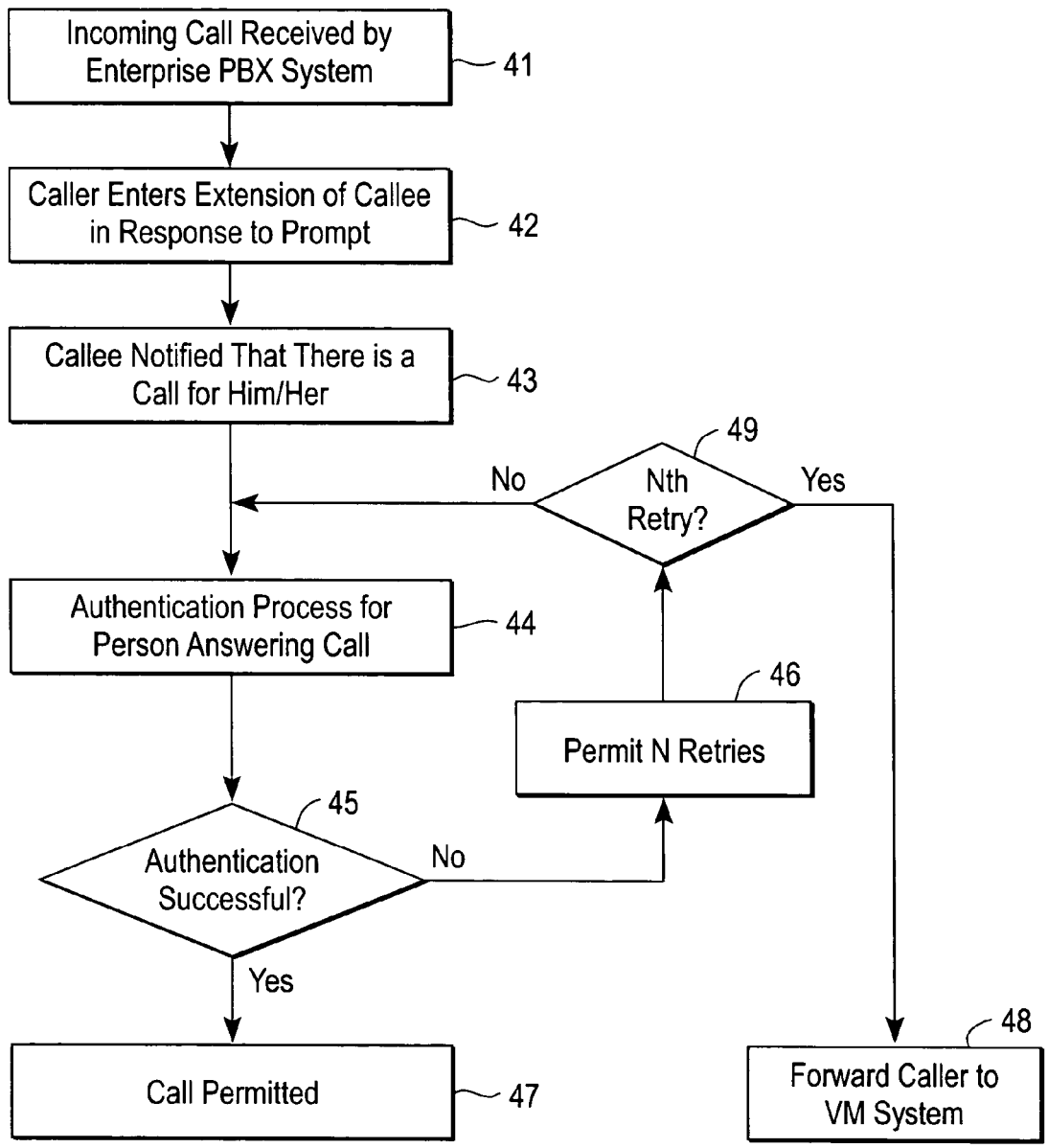
FIG. 3 is a flowchart diagram that illustrates a method of operation according to one embodiment of the present invention.

FIG. 3 is a flowchart diagram of call processing operations in accordance with one embodiment of the present invention. Consider an example scenario in a large manufacturing company with many workers working on a factory floor with a small number of telephone devices. The company's PBX phone system may be connected to a paging device. When an incoming call for a worker named is received (block 41), the PBX system first identifies the name or extension of the called party. In this example, the caller enters the extension number of the callee in response to an IVR prompt (block 42). The system may correlate the extension number with the name of the called person (e.g., Alice) and then automatically page her (block 43).

The authentication process begins when Alice (or another person) picks up the phone to answer the call (block 44). As discussed previously, Alice may be prompted to enter a keyword or passcode to authenticate her identity. Depending upon whether the authentication process is successful (decision block 45), the call may either be immediately connected, i.e., a media path is established for the incoming call (block 47), or, alternatively, the person answering the call may be permitted a number of retry attempts (e.g., "N" retries) in order to successful authenticate their proper identity. In the situation where someone besides Alice attempts to answer the call and is unable to guess the correct passcode after N retries (block 49), the call may be forwarded to the voicemail (VM) system to allow the caller to leave a voice message in Alice's VM box (block 48). The VM system may optionally notify Alice that an unauthorized individual attempted to answer the call.

In yet another embodiment of the present invention, the PBX system may be configured to provide each user with the programmable option of activating the authentication feature or not as part of their personal line settings. In other words, each worker is provided with the ability to enable/disable the authentication code that processes their telephone calls. Enabling/disabling of the authentication feature may be global, i.e., applied to all calls, or selective, i.e., where the user provides/enters a list of caller numbers, calls from which require authentication. In the latter case, any call from a number that is not included in the callee's authentication list may be answered without authentication. In still another variation, the user may specify a preferred authentication mechanism for each of the callers in his list, thus permitting the use of different keywords or passcodes associated with different callers.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of memachine-readable medium suitable for storing electronic instructions.

Additionally, although the present invention has been described in conjunction with specific embodiments, numerous modifications and alterations are well within the scope of the present invention. For example, the present invention is applicable to both wired and wireless (cellular) telephone networks of an enterprise. Additionally, instead of being implemented at the enterprise level, called party authentication may be a feature implemented at the provider level; that is, by a telephone network service provider. Accordingly, the specification and drawings are to be regarded in an illustrative rather than a restrictive sense.

We claim:

1. A private branch exchange (PBX) system for an enterprise comprising:
   a first interface to receive an incoming voice over Internet protocol (VoIP) call from a caller to a called party of the enterprise, the incoming VoIP call being received from an Internet protocol (IP) network, the first interface being further operable to receive an identifier from the caller identifying the called party;
   a second interface to connect with a telephone device that is shared among multiple users in the enterprise based on the received identifier, wherein each of the multiple users is associated with a unique identifier and the shared telephone device is associated with each of the identifiers of the multiple users, the multiple users including the called party;
   one or more processors that control a connection between the incoming VoIP call and the telephone device;
   a memory coupled to the one or more processors that stores authentication information associated with the called party;
   code executable on the one or more processors, execution of the code causing the one or more processors to obtain information from a person answering the incoming VoIP call at the telephone device, the connection for the incoming VoIP call being established only when the information provided by the person matches the authentication information associated with the called party.

2. The PBX system of claim 1 wherein the authentication information comprises a passcode.

3. The PBX system of claim 1 wherein the authentication information comprises a list containing at least one person in the enterprise authorized to answer the incoming VoIP call.

4. The PBX system of claim 1 wherein the authentication information comprises a voice signature.

5. The PBX system of claim 1 wherein execution of the code is activated by a programmable setting.

6. A private branch exchange (PBX) system for an enterprise comprising:
   a first interface to receive an incoming voice over Internet protocol (VoIP) call from a caller to a called party of the enterprise, the incoming VoIP call being received from an Internet protocol (IP) network, the first interface being further operable to receive an identifier from the caller identifying the called party;
   a second interface to connect with a telephone device that is shared among multiple users in the enterprise based on the received identifier, wherein each of the multiple users is associated with a unique identifier and the shared telephone device is associated with each of the identifiers of the multiple users, the multiple users including the called party;
   one or more processors that control a connection between the incoming VoIP call and the telephone device;
   a memory coupled to the one or more processors that stores authentication information associated with the called party;
   code executable on the one or more processors, execution of the code being activated by a programmable setting, execution of the code causing the one or more processors to obtain information from a person answering the incoming VoIP call at the telephone device, the connection for the incoming VoIP call being established only when the information provided by the person matches the authentication information associated with the called party, wherein the programmable setting is enabled by a voice signature.

7. A telephone device for sharing among a plurality of persons comprising:
   a port that connects to an Internet protocol public branch exchange (IP-PBX) system to receive an incoming call directed to a called party based on a received identifier identifying the called party; wherein the telephone device is shared among a plurality of persons, each of the plurality of persons being associated with a unique identifier and the shared telephone device is associated with each of the identifiers of the plurality of persons, the plurality of persons including the called party;
   a processor that executes code implementing a connection protocol between the IP-PBX system and the telephone device for the incoming call, wherein a media path between the IP-PBX system and the telephone device for the incoming call is established when information provided by a person answering the telephone device matches authentication information associated with the called party.

8. The telephone device of claim 7 further comprising a keypad, and wherein the information provided by the person comprises a passcode input via the keypad.

9. The telephone device of claim 7 further comprising a display coupled with the processor, a name or number of the called party appearing on the display in response to the incoming call.

10. The telephone device of claim 7 wherein the incoming call comprises a voice over Internet Protocol (VoIP) call.

11. A processor-implemented method of handling an incoming voice over Internet protocol (VoIP) call from a caller to a certain worker at an enterprise comprising:
    receiving an incoming voice over Internet protocol (VoIP) call from a caller to a certain worker;
    receiving an identifier from the caller identifying the certain worker;
    obtaining information from a worker answering the incoming VoIP call at a telephone device; the telephone device being shared among a plurality of workers at the enterprise, wherein each of the plurality of workers is associated with a unique identifier and the shared telephone device is associated with each of the identifiers of the plurality of workers;
    comparing the information obtained against authorization information stored in a database, the authorization information comprises a list of one or more of the workers authorized to receive the incoming call, the one or more of the workers including the certain worker, and, if the comparison produces a match,
    establishing a media path between the caller and the worker answering the incoming call at the telephone device.

12. The processor-implemented method of claim 11 wherein the authorization information comprises a passcode or keyword.

13. The processor-implemented method of claim 11 wherein the authorization information comprises a voice signature.

14. The processor-implemented method of claim 11 further comprising: notifying the plurality of workers in the enterprise of the incoming call.

15. The processor-implemented method of claim 14 wherein notifying the plurality of workers comprises paging the certain worker.

16. The processor-implemented method of claim 11 further comprising providing the worker with a programmable option of activating an authentication function for a list of caller numbers, the comparing of the information obtained against authorization information occurring only when the authentication function is activated at a time when the incoming VoIP call arrives at the telephone device.

17. The processor-implemented method of claim 11 wherein obtaining the information comprises prompting the worker to input a passcode or keyword.

* * * * *